Patented Nov. 23, 1943

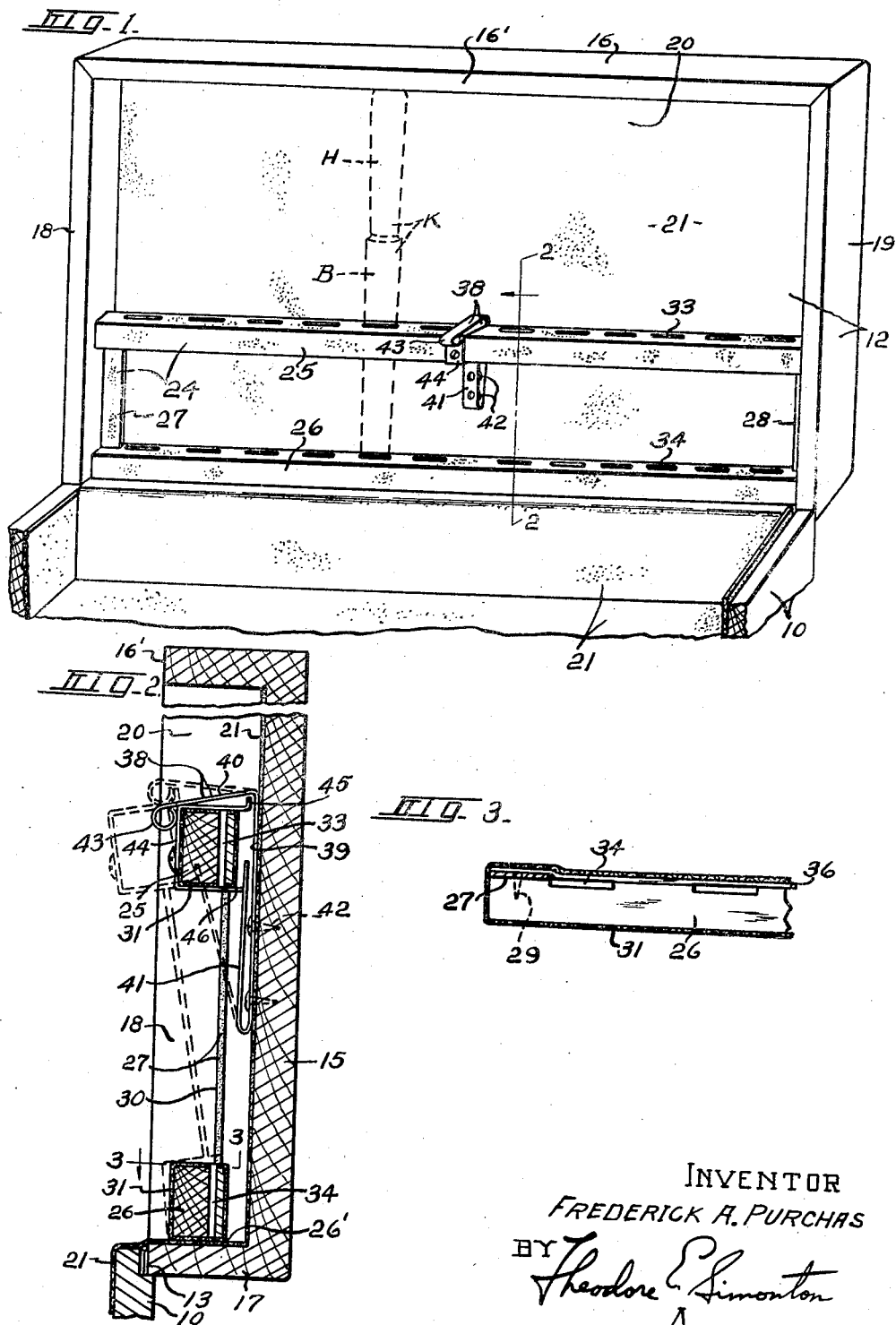

2,334,839

UNITED STATES PATENT OFFICE 2,334,839

CHEST FOR SILVERWARE

Frederick A. Purchas, McGraw, N. Y., assignor to Central Paper Box Company, McGraw, N. Y., a corporation of New York Application February 13, 1942, Serial No. 430,802

5 Claims. (Cl. 206—16)

This invention relates to improvements in a chest for silverware of the type in which a hinged lid is adapted to contain and to display silverware.

The main object of my improvement is to provide the lid of a chest for silverware with an improved knife support which is adapted, when the lid is in the open position, to maintain the knives upright with their handles exposed to view throughout the length thereof, so that the design or pattern of each handle may be clearly seen.

Another object of the invention is to provide a knife support for the lid of a chest for silverware so constructed that the knives may be quickly and easily placed into the support or removed therefrom when the lid is in the open position, and which cooperates with the sides of the lid when said lid is in the closed position for maintaining the knives against accidental displacement or disarrangement.

A further object of the invention resides in providing the lid of a chest for silverware with a simple, inexpensive and efficient knife support which may be adjusted with respect to the lid and releasably maintained in either of two adjusted positions, one a display position and the other a loading position.

I attain these objects by the structure illustrated in the accompanying drawing, in which:

Figure 1 is a perspective view showing a portion of the body member of a chest for silverware and a lid therefor embodying the knife support of this invention, said lid being shown in the open position.

Figure 2 is an enlarged detail vertical sectional view taken substantially in the plane of the line 2—2, Figure 1, showing my novel knife support in full lines in its display position and in broken lines in its loading position.

Figure 3 is a detail horizontal sectional view taken in the plane of the line 3—3, Figure 2.

The chest illustrated in Figure 1 of the drawing comprises a body member 10 of any suitable construction and which is adapted to contain forks, spoons, etc. A lid 12 is connected to the body member 10 in any well known manner, as by hinges indicated at 13, Figure 2. The lid 12 comprises a top member 15, a pair of side members 16 and 17 and end members 18 and 19, said side and end members being connected with the top member 15 to extend laterally therefrom in one direction for providing a chamber or compartment 20 at the inside of the lid adapted to contain silverware such as table knives. The body 10 and lid 12 may be composed of wood or other suitable material. The interior of the body member 10 and the inner side of the lid top 15 may be lined with suitable fabric, indicated at 21, such as felt. The chest thus far described is of usual construction.

Mounted in the compartment 20 is my novel knife support indicated by the numeral 24. This support is in the form of a rectangular frame or rack arranged within the lid compartment 20 adjacent that side of the lid which is hingedly connected with the body 10. The frame or rack 24, in this instance, comprises an upper or outer bar member 25 and a lower or inner bar member 26. These bars extend longitudinally through the compartment 20 from adjacent one end member 18 to adjacent the other end member 19. The bars 25 and 26, while terminating adjacent the end members 18 and 19, are adapted to freely move inwardly or outwardly with respect to said end members. The bars 25 and 26 are connected to each other at their ends by flat straps 27 and 28 composed of steel or other suitable material. The straps or end members 27 and 28 may be secured in any suitable manner to the bars 25 and 26 as by screws or brads 29, as indicated in Figure 3. The straps or bars 27 and 28 are each preferably covered with fabric indicated at 30. Likewise the upper and lower bars 25 and 26 are shown covered with fabric indicated at 31. These coverings 30 and 31 may be of the same material as the lining 21. However, it will be obvious that the fabric covering for the frame or rack 24 may be of a different grade of material from that of the lining 21 and also of different color if desired.

The frame 24 is preferably hingedly connected to the lid 12 so as to swing from a normal position within the lid in substantially parallel relation with the top 15 outwardly into more or less angular relation with said top, as indicated in Figure 2. For this purpose, the fabric covering 31 of the lower bar 26 is cemented or glued at the lower side 26' thereof to the adjacent portion of the fabric lining 21. The outward swinging movement of the frame or rack 24 is relatively slight so that the fabric lining 21 and 31 yields sufficiently with respect to the adjacent portions of the lid end member 17 and bar 26 to permit this slight angular movement of the lower bar with respect to the lid.

In order that the rack or frame 24 will readily support the knives, the bars 25 and 26 are each provided with a series of, in this instance twelve, slots 33 and 34 respectively, the slots of one series being in alignment transversely of the frame with corresponding slots of the other series. These slots are substantially rectangular in cross section and are adapted to receive the blades B of the knives K, as indicated in Figure 1 of the drawing. The slots 33 and 34 are formed, in this instance, by cutting away a portion of the corresponding bar at the inner side thereof adjacent the lid top 15, as illustrated more particularly in Figure 3. Each bar has a strap 36 composed of cardboard or other suitable material glued or otherwise secured to said inner side for forming one side of the slots 33 and 34.

The frame or rack 24 is releasably held in either its normal knife holding position substantially parallel with the top 15 of the lid or in a knife receiving position inclined with respect to said top by a catch member 38. Catch 38 is composed of a single, unitary piece or strip of spring metal bent to form a body portion 39, a latch 40 and a flat compression spring 41. The body portion 39 of the catch extends transversely of the top 15 and is secured thereto by screws 42. Latch 40 is formed at the upper end of the body portion 39 and extends outwardly therefrom over the upper bar 25 of frame 24. The outer end of the latch member is looped, as at 43, to provide a pendent stop shoulder adapted to extend downwardly at the outer or forward side of the bar 25 into engagement with a keeper member 44 secured to the bar. The spring 41 extends upwardly from the lower or inner end of the body portion 39 to a position intermediate the bar 25 and top 15. The keeper member 44, in this instance, is composed of a thin metal strap bent U-shape to receive the bar 25 therein. The upper leg of the keeper has the inner end thereof bent upwardly to form a stop shoulder 45 arranged, when the frame is in its normal position, adjacent to the body portion 39 of the catch at the junction of said body with the latch 40. This shoulder 45 is for the purpose of engaging the shoulder 43 of the latch member 40 when the frame is in its outward inclined position for limiting the outward movement of said frame, as indicated by broken lines in Figure 2. The lower leg 46 of the keeper member 44 extends inwardly a short distance beyond the adjacent inner side of the bar 25 for engagement with spring 41 which is tensioned to urge the frame to its outermost position.

When it is desired to place knives in the frame 24, said frame is first released by raising the latch 40 to bring the shoulder 43 above the adjacent side of the keeper 44. The spring element 41 then urges the rack outwardly until the shoulder 45 contacts the shoulder 43. This positions the knife receiving slots 33 and 34 in a plane extending from the compartment 21 of the lid outwardly, in outward spaced relation to the outer edge 16' of the lid side 16. It will now be obvious that knives, as K, may be readily brought into operative relation with the frame 24 to be supported thereby by inserting the blades of the knives into corresponding aligned slots 33 and 34. After the knives have been thus mounted in the frame 24, said frame is pushed inward, against the action of the spring element 41, to its innermost position. The latch 40 now springs downwardly and shoulder 43 engages the outer face of the keeper 44 and maintains the frame in its innermost position, as indicated in Figure 2. When the frame is in its innermost position, the knives K are maintained wholly within the chamber or compartment 21 with the handle portion H of each knife positioned above the frame 24 and therefore in the upper portion of the compartment 21 where said handles are in full view and the form or design of each handle is plainly discernible. Furthermore, when the frame 24 is in its normal innermost position, the knives will be maintained in the frame due to the fact that said knives are held against longitudinal movement by the upper and lower side members 16 and 17 of the lid. It therefore follows that when the lid is in its lowermost or closed position in overlying relation with the body portion 10, the knives are held in the frame slots and will, therefore, be maintained in their proper relation with respect to the frame 24 and to each other. The knives therefore remain fixed with respect to each other and to frame 24 during the opening or closing of the lid or when the chest is being transported from one locality to another.

Although the construction and operation of my device is relatively simple, it is obvious that certain changes may be made in the details of the construction thereof without departing from the spirit of the invention, and, therefore, I do not wish to be limited to the exact construction shown but only by the scope of the appended claims.

I claim:

1. In a chest for silverware, a lid adapted to house articles of silverware and hinged at one side to the chest to swing from an open to a closed position, means for supporting the articles of silverware comprising a frame having means engageable with the articles of silverware for maintaining the same in said frame, means connecting said frame to said lid for movement of said frame from a normal display position with said frame disposed substantially parallel to and within the confines of said lid to a loading position with said frame projecting from said lid, whereby the articles of silverware may be readily placed into or removed from said frame, and means for releasably maintaining said frame in at least said normal position.

2. In a chest for silverware, a lid adapted to house articles of silverware and hinged at one side to the chest to swing from an open to a closed position, means for supporting the articles of silverware comprising a frame having means engageable with the articles of silverware for maintaining the same in said frame, means hingedly connecting said frame to said lid adjacent the hinged side thereof for swinging movement of said frame from a normal display position with said frame disposed substantially parallel to and within the confines of said lid to a loading position with said frame projecting angularly away from said lid, whereby the articles of silverware may be readily placed into or removed from said frame, and means for releasably maintaining said frame in at least said normal position.

3. In a chest for silverware, a lid adapted to house table knives and hinged at one side to the chest to swing from an open to a closed position, means for supporting the knives comprising a frame having spaced bars formed with a series of slots arranged in aligned relation for receiving the blades of the knives and maintaining the knives in said frame, said frame being located adjacent the hinged side of said lid and said bars being so spaced that the handles of said knives are maintained wholly at the side of said frame opposite the hinged side of said lid, means hingedly connecting said frame to said lid adjacent the hinged side thereof for swinging movement of said frame from a normal display position with said frame disposed substantially parallel to and within the confines of said lid to a loading position with said frame projecting angularly away from said lid, whereby the knives may be readily placed into or removed from said slots, and means for releasably maintaining said frame in either of said positions.

4. In a chest for silverware, a lid adapted to house table knives and hinged at one side to the chest to swing from an open to a closed position, means for supporting the knives comprising a frame having means engageable with the blades of the knives for maintaining the knives in said frame, means hingedly connecting said frame to said lid for swinging movement of said frame from a normal display position with said frame disposed substantially parallel to and within the confines of said lid to a loading position with said frame projecting angularly away from said lid, whereby the knives may be readily placed into or removed from said frame, and means for releasably maintaining said frame in either of said positions comprising catch and keeper elements connected with said lid and with said frame, said catch and keeper elements having cooperating stop means brought into engagement with each other upon movement of the frame from one of said positions to the other of such a character that the frame is releasably maintained in either of said positions, and spring means yieldingly urging said frame to its outer position.

5. In a device for releasably maintaining a movable silverware article support for a silverware chest in either of two adjusted positions, in combination, a keeper member connected with said support having a pair of spaced stop elements, a clasp comprising a spring strap member adapted to be secured to the chest adjacent said support, said strap having a portion projected to form a resilient latch member extending over said keeper member, said latch member being bent to form a stop element adapted to engage either of the stop elements on the keeper member, said strap member having a second portion bent to form a spring element engageable with the keeper member for urging the support in one direction to maintain the stop element on the latch member in holding engagement with either stop element on the keeper member.

FREDERICK A. PURCHAS.